United States Patent [19]
Hutchinson

[11] Patent Number: 6,109,006
[45] Date of Patent: Aug. 29, 2000

[54] PROCESS FOR MAKING EXTRUDED PET CONTAINERS

[75] Inventor: Gerald A. Hutchinson, Cote de Caza, Calif.

[73] Assignee: Advanced Plastics Technologies, Ltd., United Kingdom

[21] Appl. No.: 09/115,157

[22] Filed: Jul. 14, 1998

[51] Int. Cl.[7] ............................. A47J 41/00; B29C 47/00; B32B 15/08

[52] U.S. Cl. ............................. 53/452; 53/140; 215/13.1; 220/611; 220/62.22; 264/37.32; 264/173.15; 264/150

[58] Field of Search ................... 53/452, 140; 215/13.1; 220/611, 613, 62.13, 62.12, 62.22; 264/37.32, 173.12, 173.13, 173.14, 173.15, 150

[56] References Cited

U.S. PATENT DOCUMENTS

| | | | |
|---|---|---|---|
| Re. 34,537 | 2/1994 | Deyrup | 428/35.7 |
| 3,305,528 | 2/1967 | Wynstra et al. | 260/47 |
| 3,317,471 | 5/1967 | Johnson et al. | 260/47 |
| 3,395,118 | 7/1968 | Reinking et al. | 260/47 |
| 3,538,595 | 11/1970 | Barnes . | |
| 3,597,516 | 8/1971 | Harwood et al. . | |
| 3,812,230 | 5/1974 | Takahashi . | |
| 3,940,001 | 2/1976 | Haefner et al. . | |
| 4,130,616 | 12/1978 | Clifford . | |
| 4,217,161 | 8/1980 | Yamada et al. . | |
| 4,249,875 | 2/1981 | Hart et al. . | |
| 4,268,336 | 5/1981 | Piltz et al. . | |
| 4,323,411 | 4/1982 | Uhlig . | |
| 4,364,896 | 12/1982 | Kontz . | |
| 4,410,482 | 10/1983 | Subramanian . | |
| 4,438,254 | 3/1984 | Doorakian et al. | 528/89 |
| 4,480,082 | 10/1984 | McLean et al. | 528/103 |
| 4,510,115 | 4/1985 | Gokcen et al. . | |
| 4,544,190 | 10/1985 | McHenry et al. . | |
| 4,559,197 | 12/1985 | Dick et al. . | |
| 4,560,741 | 12/1985 | Davis et al. | 528/302 |
| 4,578,295 | 3/1986 | Jabarin | 428/35 |
| 4,587,073 | 5/1986 | Jakobsen | 264/515 |
| 4,587,075 | 5/1986 | Butcher et al. . | |
| 4,604,257 | 8/1986 | Smith et al. . | |
| 4,618,386 | 10/1986 | Yatsu et al. . | |

(List continued on next page.)

FOREIGN PATENT DOCUMENTS

| | | |
|---|---|---|
| 0 019 438 A1 | 11/1980 | European Pat. Off. . |
| 0 212 339 B1 | 4/1983 | European Pat. Off. . |
| 0 095 909 B1 | 5/1983 | European Pat. Off. . |

(List continued on next page.)

OTHER PUBLICATIONS

Barger, et al.: "Lamellar Injection Molding Process for Multiphase Polymer Systems": The Dow Chemical Company, Central Research & Development Midland, MI.

"Introducing the LIM Advantage": The Dow Chemical Company.

Suematsu: "Growth Prospects & Challenges for PET in Asia/Japan: A Producer's Prospective": Mutsui Petrochemical Industries, Ltd.

White et al.; "High–Barrier Structural Thermoplastics Based on Diglycidyl Ethers"; Polymer Science; vol. 34(1) 1993; pp. 904–905.

"Mitsui B–010:Gas Barrier Polyester"; Chemical Data Sheet; Mitsui Chemicals, Inc.; Feb. 1, 1998.

*Primary Examiner*—Brian L. Johnson
*Assistant Examiner*—Matthew Luby
*Attorney, Agent, or Firm*—Knobbe, Martens, Olson & Bear, LLP.

[57] ABSTRACT

A method for extruding, calibrating, and cooling a multi-layer profile comprising polyethylene terephthalate (PET) and a barrier material, and the product produced by such method. The method further encompasses the use of a standard can seamer and standard can closures to seal said extruded profile with food contained therein. The invention permits the extrusion and effective cooling and calibration of larger diameter and smaller thickness PET profiles or pipes in commercial quantities with effective control of quality and eccentricity of the profiles produced.

19 Claims, 10 Drawing Sheets

U.S. PATENT DOCUMENTS

| | | | |
|---|---|---|---|
| 4,647,648 | 3/1987 | Silvis et al. | 528/103 |
| 4,649,004 | 3/1987 | Nohara et al. | |
| 4,665,682 | 5/1987 | Kerins et al. | 53/452 |
| 4,719,069 | 1/1988 | Reymann et al. | |
| 4,810,542 | 3/1989 | Kawai et al. | |
| 4,857,258 | 8/1989 | Le Doux et al. | |
| 4,867,664 | 9/1989 | Fukuhara | 425/132 |
| 4,980,211 | 12/1990 | Kushida | 428/36.7 |
| 4,982,872 | 1/1991 | Avery | 220/461 |
| 4,992,230 | 2/1991 | Belcher | |
| 5,071,029 | 12/1991 | Umlah et al. | |
| 5,080,850 | 1/1992 | Holloway | |
| 5,085,567 | 2/1992 | Neumann | 425/71 |
| 5,085,821 | 2/1992 | Nohara | 264/515 |
| 5,094,793 | 3/1992 | Schrenk et al. | 264/171 |
| 5,110,519 | 5/1992 | Daubenbuchel et al. | 264/402 |
| 5,115,075 | 5/1992 | Brennan et al. | 528/99 |
| 5,134,218 | 7/1992 | Brennan et al. | 528/99 |
| 5,143,998 | 9/1992 | Brennan et al. | 528/99 |
| 5,202,074 | 4/1993 | Schrenk et al. | 264/241 |
| 5,275,853 | 1/1994 | Silvis et al. | 428/35.4 |
| 5,300,541 | 4/1994 | Nugent, Jr et al. | 523/414 |
| 5,346,379 | 9/1994 | Wolfl | 425/67 |
| 5,443,766 | 8/1995 | Slat et al. | 264/37 |
| 5,464,106 | 11/1995 | Slat et al. | 215/12.1 |
| 5,472,753 | 12/1995 | Farha | 428/35.7 |
| 5,489,455 | 2/1996 | Nugent, Jr. et al. | 428/36.91 |
| 5,491,204 | 2/1996 | Nugent, Jr. et al. | 525/523 |
| 5,508,076 | 4/1996 | Bright | 428/36.6 |
| 5,514,325 | 5/1996 | Purstinger | 264/560 |
| 5,549,943 | 8/1996 | Vicik | |
| 5,587,125 | 12/1996 | Roychowdhury | |
| 5,599,494 | 2/1997 | Marcus | 264/513 |
| 5,628,950 | 5/1997 | Schrenk et al. | 264/241 |
| 5,628,957 | 5/1997 | Collette et al. | 264/512 |
| 5,630,982 | 5/1997 | Boring | 264/407 |
| 5,651,933 | 7/1997 | Slat et al. | 264/250 |
| 5,652,034 | 7/1997 | Seiner | 428/36.6 |
| 5,688,570 | 11/1997 | Ruttinger | 428/35.7 |
| 5,688,572 | 11/1997 | Slat et al. | 428/36.91 |
| 5,728,439 | 3/1998 | Carlblom et al. | 428/36.91 |
| 5,731,094 | 3/1998 | Brennan et al. | 428/474.4 |
| 5,759,654 | 6/1998 | Cahill | 428/36.91 |
| 5,772,056 | 6/1998 | Slat | |

FOREIGN PATENT DOCUMENTS

| | | |
|---|---|---|
| 0 105 826 B1 | 7/1983 | European Pat. Off. |
| 0 092 979 B1 | 11/1983 | European Pat. Off. |
| 0 096 581 B1 | 12/1983 | European Pat. Off. |
| 0 126 575 A2 | 5/1984 | European Pat. Off. |
| 0 118 226 B2 | 9/1984 | European Pat. Off. |
| 0 125 107 A1 | 11/1984 | European Pat. Off. |
| 0 156 085 B1 | 11/1984 | European Pat. Off. |
| A2 0 126 575 | 11/1984 | European Pat. Off. |
| 0 174 265 A2 | 3/1985 | European Pat. Off. |
| 0 171 161 B1 | 6/1985 | European Pat. Off. |
| 0 153 120 B1 | 8/1985 | European Pat. Off. |
| 0 153 894 B1 | 9/1985 | European Pat. Off. |
| 0 160 984 B1 | 11/1985 | European Pat. Off. |
| 0 176 229 B1 | 4/1986 | European Pat. Off. |
| 0 191 701 A2 | 8/1986 | European Pat. Off. |
| 0 203 630 A2 | 12/1986 | European Pat. Off. |
| 0 215 630 B1 | 3/1987 | European Pat. Off. |
| 0 280 736 A1 | 9/1988 | European Pat. Off. |
| 0 287 839 A2 | 10/1988 | European Pat. Off. |
| 0 325 030 A2 | 11/1988 | European Pat. Off. |
| 0 306 675 B1 | 3/1989 | European Pat. Off. |
| 0 341 044 B1 | 3/1989 | European Pat. Off. |
| 0 351 118 A2 | 1/1990 | European Pat. Off. |
| 0 395 237 A1 | 4/1990 | European Pat. Off. |
| 0 368 278 A2 | 5/1990 | European Pat. Off. |
| 0 376 469 B1 | 7/1990 | European Pat. Off. |
| 0 462 455 A1 | 6/1991 | European Pat. Off. |
| 0 524 572 B1 | 7/1992 | European Pat. Off. |
| 0 544 545 A1 | 11/1992 | European Pat. Off. |
| 0 583 953 A1 | 12/1993 | European Pat. Off. |
| 0 581 970 A1 | 2/1994 | European Pat. Off. |
| 0667 193 B1 | 2/1995 | European Pat. Off. |
| 0 678 554 A1 | 10/1995 | European Pat. Off. |
| 0 689 933 A2 | 1/1996 | European Pat. Off. |
| 0 767 049 A2 | 10/1996 | European Pat. Off. |
| 0 774 491 A2 | 11/1996 | European Pat. Off. |
| 0 667 193 B1 | 7/1998 | European Pat. Off. |
| 30 44 930 A1 | 10/1981 | Germany. |
| 3407 060 C2 | 4/1986 | Germany. |
| 3518 441 C2 | 3/1987 | Germany. |
| 3518 875 C2 | 9/1989 | Germany. |
| 3121 420 C2 | 3/1990 | Germany. |
| 3121 421 C2 | 8/1990 | Germany. |
| 196 40 662 C1 | 3/1998 | Germany. |
| WO 87/02680 | 10/1986 | WIPO. |
| WO 97/40981 | 11/1987 | WIPO. |
| WO 89/08556 | 9/1989 | WIPO. |
| WO 93/01988 | 7/1991 | WIPO. |
| WO 92/01558 | 2/1992 | WIPO. |
| WO 93/07068 | 4/1993 | WIPO. |
| WO 93/25835 | 12/1993 | WIPO. |
| WO 94/19186 | 9/1994 | WIPO. |
| WO 95/29805 | 11/1995 | WIPO. |
| WO 97/28218 | 2/1996 | WIPO. |
| WO 96/35571 | 3/1996 | WIPO. |
| WO 96/33062 | 4/1996 | WIPO. |
| WO 97/09366 | 8/1996 | WIPO. |
| WO 97/26127 | 7/1997 | WIPO. |
| WO 97/34758 | 9/1997 | WIPO. |
| WO 97/40972 | 11/1997 | WIPO. |
| WO 97/44174 | 11/1997 | WIPO. |
| WO 97/47695 | 12/1997 | WIPO. |

PROCESS FOR MAKING EXTRUDED PET CONTAINERS

FIELD OF THE INVENTION

This invention relates to the extrusion of polyethylene terephthalate material into containers and to multilayer containers formed by extrusion without blow molding incorporating at least one layer of polyethylene terephthalate.

BACKGROUND OF THE INVENTION

In plastic containers adapted to contain food, carbonated beverages and the like, it is highly desirable that the container be formed of material providing wall structures of low gas permeability to allow the food and beverages to be stored over long periods of time without going stale or flat, respectively. It is often highly desirable that the container material be totally transparent so that the material stored in the container can be viewed by the consumer. In addition, it is necessary that the material forming the container or, at least the material of the inner surface of the container which is in contact with the food or beverage, have the approval of the United States Food and Drug Administration (FDA).

Polyethylene terephthalate (PET) is an FDA approved material which is widely used in forming plastic beverage containers. In addition, PET which has been recovered from previously used containers and the like, so-called recycled polyethylene terephthalate (RPET), is also used in making plastic beverage containers. While newly polymerized polyethylene terephthalate (commonly referred to as virgin PET) has, as noted above, FDA approval, RPET is not FDA approved and thus cannot be used in direct contact with the beverage or food. This has led to a practice in which beverage containers are formed of layered materials, with the inner layer of virgin PET being in contact with the beverage and the outer layer of RPET being on the outside of the container. Both these layers may be formed together by various techniques involving fusion or co-molding, with or without an adhesive layer between the PET layers.

Numerous methods have been disclosed in the art for forming PET containers, primarily used in making PET bottles for use with liquids or beverages. Some of these methods include the use of multiple layers of material with efforts to keep FDA approved layers on the inside in contact with the food or beverage with non-FDA approved layers outside. One of the most common features of these methods is the use of extrusion or injection molding to create a pre-form or blank container of smaller size than actually required which is then blow molded into the appropriate size. Examples of this type of practice would include U.S. Pat. No. 4,587,073 to Jakobsen and U.S. Pat. No. 5,085,821 to Nohara. In the '073 patent two layers are coextruded to form a blank. In this process, the patent discloses that it may be expedient to extrude continuously a tube which is thereupon cut into pieces of suitable length. These pieces of tubing are enclosed at one end while at the same time being shaped at their other end in order to permit their fastening in a forming apparatus. The '073 patent discloses that the closing process involves fastening the tube over a mandrel, heating the part of the blank to be closed and then closing the blank around the end of the mandrel to assume the desired rounded final shape. The '821 patent also discloses the use of coextrusion of a multilayer pipe, cutting it into a predetermined length, and then closing one end of the cut pipe by fusion bonding to form a bottom portion, and then forming the other end of the cut pipe into a neck portion having an opening in the top end and a fitted or screwed part on the periphery. In both the '073 and '821 patents, after the preformed blank is extruded or otherwise manufactured, the final product is reached by blow molding the preform into the desired shape and size.

While it would be significantly less expensive to be able to create PET based containers by simply extruding them without need for an injection molding or blow molding step, the industry has consistently maintained the use of pre-forms followed by blow molding. In large part, this is because of the difficulty in successfully extruding PET tubes or PET based tubes of appropriate diameters and thicknesses to provide the final structure for a can or other container.

The prior art does provide some base methods for extruding thermoplastic tubing. Examples include U.S. Pat. No. 5,630,982 to Boring and U.S. Pat. No. 5,085,567 to Neumann et al. The disclosures of these patents, which are incorporated herein by reference, provide information on the use of calibration systems for maintaining tubular shape and low eccentricity in the extrudate while it is in its cooling process. While these patents address extruding of thermoplastic materials, they do not specifically address the possibilities and problems of extruding PET in larger diameters and/or smaller thicknesses.

Plastic tubes, such as those suggested in the current invention (generically referred to herein as profiles, and more specifically as pipes or tubes), can be produced by an extrusion process in which dry polymeric raw materials are passed to an extruder which employs one or more screw-type devices which knead and compress the raw material. Heat is applied in the extruder and the combination of heat and pressure turn the dry raw material into a molten plastic. At the discharge end of the extruder, the molten plastic is forced through a die, more specifically between an outer die portion and a central die insert.

As the hot plastic tubing exists the die, it is passed into a vacuum calibrated box which is maintained at reduced pressure and filled with a cooling fluid, typically water. Within the vacuum calibration box is a sizing sleeve or collar, possibly in the form of a series of wafers, which is smaller in diameter than the tubing exiting the die. Because an axial force is applied to the hot tubing as it exits the die, the tubing is reduced in diameter and thickness before it enters the vacuum calibrated box, which is called "draw down."

The center of the extruded tubing is maintained at atmospheric pressure, while the exterior is subjected to reduced pressure in the vacuum calibration box. The pressure within the tubing thus tends to expand the tubing against the sizing collar and the result is tubing of a fairly uniform outer diameter. Another common feature in vacuum calibration systems is the use of a spray of water within the system itself against the outside surface of the extruded pipe as it is passed through the calibration chamber. This wet calibration has in practice established itself over dry calibration processes because the water may act like a lubricant between the extruded pipe and the inside of the wall of the calibrating sleeve within the calibration chamber. While the prior art addresses generally the tools, including calibration, for successfully extruding thermoplastic pipes in general, a significant gap exists in successfully calibrating PET based plastic pipes or tubes of the desired diameter and thickness.

Multiple layer containers present an additional consideration. PET is relatively permeable to carbon dioxide and oxygen so the containers formed of PET have a relatively short shelf life. In order the prolong the shelf life of such containers, it is known in the art to incorporate a barrier material in such containers. Typically, such containers may be formed of an interior layer of virgin PET (referred to herein as PET, as compared with RPET for recycled PET), a barrier layer, and an outer layer formed of RPET. Containers of this nature are disclosed in U.S. Pat. No. 5,464,016 to Slat et al. As disclosed in Slat, a suitable container configuration includes an inner layer formed of PET or polyethylene naphthylate, an outer layer of RPET, and an intermediate barrier layer which may be formed of acrylonitrile copolymers, ethylene vinyl alcohol copolymers, vinyladene chloride copolymers, and copolymers of vinyladene chloride with vinyl chloride or methylacrylate. Various procedures are disclosed in Slat for forming the containers of three layers, i.e., an interior layer of an FDA approved polymer, an intermediate barrier layer, and an outer layer such as RPET which does not have FDA approval. One technique involves the application of an inner layer polymer and a barrier layer polymer which are applied to an interior mold to make a preform. This can be accomplished by various techniques, including coextrusion. This is followed by various procedures which can then involve an injection molding technique in which the outer layer is applied over the preform. The preform is then subjected to a blow molding operation to arrive at the final product. Another technique for forming beverage containers and similar multilayered articles involves so-called lamellar injection molding such as disclosed in U.S. Pat. No. 5,202,074 to Schrenk et al., which is incorporated herein by reference. As disclosed in the Schrenk patent, a plurality of thermoplastic polymers can be applied through respective extruders to a coextrusion feedblock which functions to generate and arrange layers in any of a number of configurations. As described in Schrenk, using the designation of "A," "B," and "C" for three different polymers applied through extruders to a coextrusion feedblock system, layer orientations of A B C, A B A B A, or A B C B A configurations can be arrived at. In addition to the orientation of the various polymer materials, the thickness of individual layers can likewise be controlled, and in competitive multiplication of the lamellar injection technique, the several polymer materials can be extruded in such thin layers that they become centrally a homogenous material. The Schrenk process discloses the such lamellar injection systems in the production of plastic beverage containers involving multilayer structures involving an FDA approved material such as PET with a barrier material such as ethylene vinyl alcohol.

An alternative system, somewhat related to the lamellar injection system, which may be used to produce multilayer extruded pipes is the modular disk die discussed in the article "Back to Basics with Annular Coextrusion, the Invention of the Modular Disk Die", by Henry G. Schirmer. The modular disk die disclosed in these materials consists of four basic elements: a melt inlet plate; the melt dividing module; the mandrel assembly; and the lower exit plate. This annular coextrusion die uses modules of assembled disks which can be stamped from thinner metal or machined from thicker metal. These modules define the layers and structural arrangement. In one disclosed embodiment, the die is able to handle 12 separate melts or less and distribute them in discrete layers of any desired configuration. This MDD or modular disk die provides another alternative to the LIM (lamellar injection molding) discussed in the preceding paragraph.

Effective barrier materials used in the fabrication of container parisons are fusion blends of PET and polyester based copolymers as disclosed in U.S. Pat. No. 4,578,215 to Jabarin. As disclosed in Jabarin, such barrier materials include copolymers such as copolymers of terephthalic acid and isothalic acid with one or more diols, particularly ethylene glycol in combination with other dihydroxy alcohols, specifically, 1, 3 bis (2 hydroxy ethoxy) benzene. Other suitable reactants include cell foams such as disk (4-beta-hydroxy ethoxy phenol) cell foam and additives such as stabilizers, processing aids, pigments, etc. The barrier materials thus formulated can be mixed with PET to form intimate fusion blends of 80 to 90 percent PET and 10 to 20 percent polyester to form barriers that are about 20 to 40 percent gas barriers to $CO_2$ transmission than PET alone.

Barrier materials of the type disclosed in the Jabarin reference have heretofore been used in formulations of long shelf life containers by using such materials as blends with another FDA approved material such as PET. As disclosed in a paper by Suematsu, "Growth Prospects and Challenges for PET in Asia/Japan Producers Perspective," presented in Singapore, May 19–20, 1997, a commercially available copolyester of the type disclosed in the Jabarin patent can be blended with PET to provide a material of substantially lower permeability of carbon dioxide and PET. This product identified as copolyester B010 is said to have substantially better barrier properties than polyethylene naphthylate and to be useful as a blend with PET to form a barrier material having FDA approval.

SUMMARY OF THE INVENTION

In accordance with the present invention there is provided a container of the type adapted to contain an ingestible product and having a tubular multi-layer wall portion. The container includes an inner multi-component layer formed by extrusion having at least two discreet sublayers. The inner multi-component layer extends longitudinally and terminates in opposing open flanged end portions adapted to receive a standard can base and a standard can closure respectively. One of the sublayers includes virgin polyethylene terephthalate and another of the sublayers is a barrier layer of a thermoplastic material having a reduced permeability to oxygen and carbon dioxide relative to the permeability to oxygen and carbon dioxide of virgin polyethylene terephthalate. The multi-layer wall portion further includes an outer layer material formed by extrusion of recycled polyethylene terephthalate. This outer layer has a thickness greater than the thickness of the barrier sublayer. The multi-layer wall portion is extruded and calibrated as a tubular member with an inner diameter of greater than about 20 mm or with a total thickness of less than about 0.08 inches.

In a further embodiment of the invention there is provided a process for making such a container. This method includes providing a first body of a thermoplastic polymer comprising virgin polyethylene terephthalate, a second body of a thermoplastic polymer comprising a barrier material having a reduced permeability to oxygen and carbon dioxide and a third body of a thermoplastic polymer comprising polyethylene terephthalate. The polymers are extruded through a die to provide a composite-multilamellae stream with a tubular profile having at least one discrete lamella of virgin polyethylene terephthalate and at least another discrete lamella of the barrier material. The outer surface of the composite stream is sprayed with a flow of fluid having a temperature less than the temperature of the composite stream. The composite stream is calibrated to a profile with an inner diameter greater than about 20 mm or with a total thickness of less than about 0.08 inches. The profile is cooled and solidified by putting it into thermally conductive contact with a first heat absorbing source and then by putting it into thermally conductive contact with a second heat absorbing source, wherein the second heat absorbing source has a temperature less than the temperature of the first heat absorbing source. The solidified profile is then cut into sections in preparation for later sealing by attachment of a base and a lid.

DETAILED DESCRIPTION OF THE INVENTION

The present invention addresses the extrusion of PET or multilayer thermoplastic profiles which include at least one PET layer with diameters and thickness appropriate for usage as food or beverage containers without need for blow molding. This invention also involves an overall process of manufacturing these containers including both the layer formation extrusion and calibration as well as the cutting and forming of the extruded pipe and the closing of the ends of the pipe in the process of forming and packaging food and beverage ("ingestible" products, which could also include pharmaceuticals) containers. A further aspect of the present invention involves the product created by this process as either the cut and flanged pipe (referred to generically as an extruded profile (or simply a profile) and more specifically as a pipe or tube) produced by the extrusion and calibration process or the final can which is merely the profile with the addition of a base and a closure.

Figure 1:
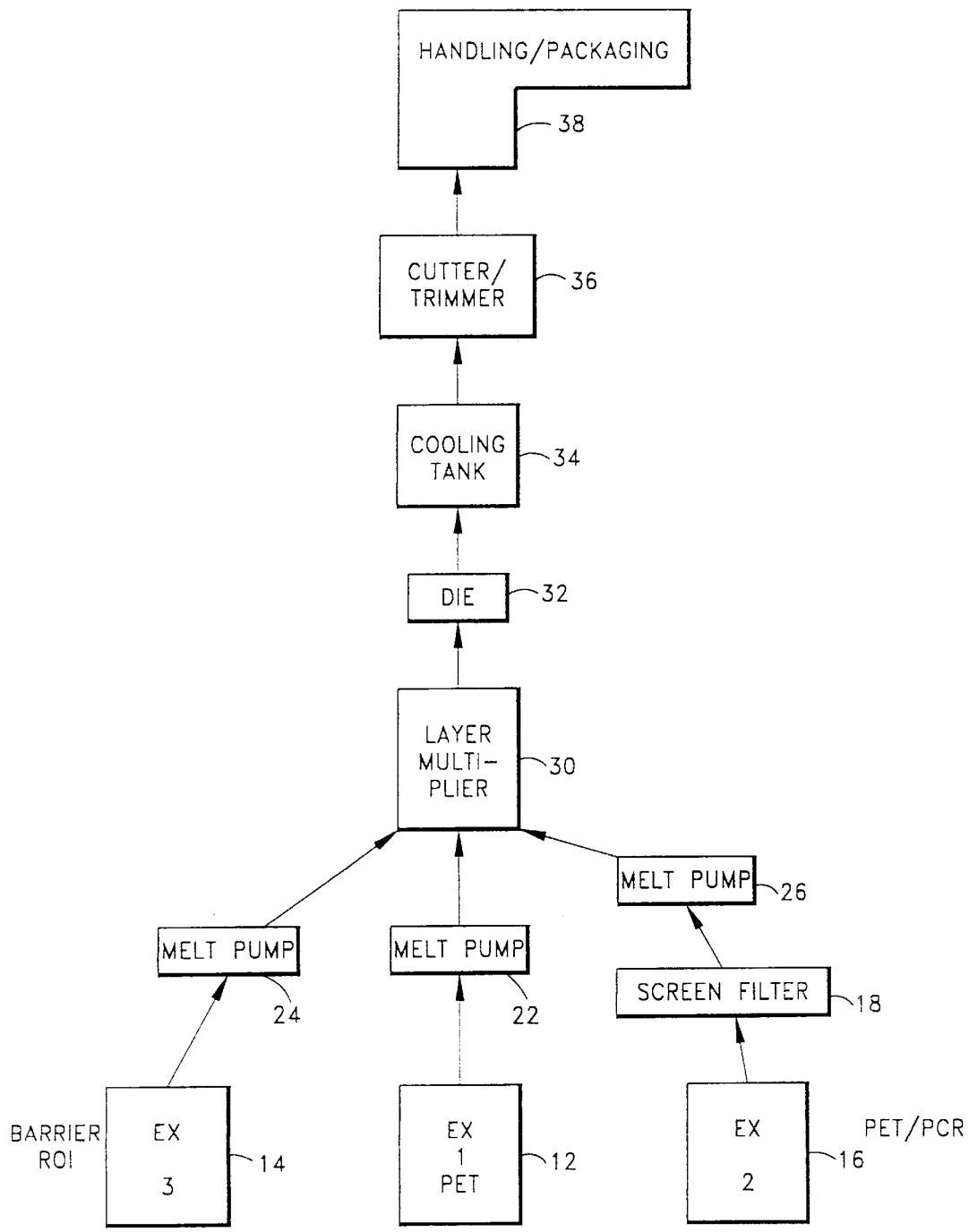
FIG. 1 is a schematic view of an embodiment of the complete process of making the PET-based containers.

FIG. 1 provides an overview of one embodiment of the process of the current invention. The embodiment of FIG. 1 utilizes standard polymer extruders 12, 14, and 16 and specialized components producing a mono or multilayer profile. The central material (i.e. material to be used in the central or innermost layer) provided by central extruder 12 is polyethylene terephthalate. The intermediate material or barrier material is provided by barrier extruder 14 and may comprise any number of barrier materials as discussed previously and hereinafter.

A new method of providing improved barrier properties in a multilayer PET container including use a various materials and structures or formations (although primarily focused on blow molded beverage containers), is disclosed in co-pending U.S. patent application Ser. No. 08/953,595, filed on Oct. 17, 1997, the disclosure of which is incorporated herein by reference. This application specifically uses procedures of the type such as disclosed in the aforementioned patents to Slat et al. and Schrenk, to form beverage containers and the like. In contrast with the use of injection molding techniques in Slat to produce liners of multilayered preforms in which the layers can be readily separated, several layers in configurations to retard such separation are incorporated. Moreover, in the preferred embodiments, repeated sublayers are incorporated by lamellar injection molding techniques in order to minimize diffusions if layer separation occurs.

The preparation of the multilayer containers in accordance with the referenced application can be characterized in terms of several discrete procedures as involving injection molding followed by injection molding over an initially formed preform, characterized by the shorthand notation "inject-over-inject," the formation of an initial preform by injection molding followed by application of lamellar injection molding, characterized by the shorthand notation "LIM-over-inject," and the formation of an initial preform by lamellar injection molding followed by injection molding over this preform characterized in this description as "inject-over-LIM." While incorporating the use of barrier materials in combination with PET based containers, this application still focuses on injection molded preforms which are blow molded into containers primarily for use in beverages. The ideas on the use of multiple layer barrier systems and the disclosure on barrier materials provided by this co-pending application support the overall inventive aspects of the present application.

In FIG. 1, in addition to the polyethylene terephthalate provided by central extruder 12 and the barrier material provided by barrier extruder 14, the remaining material is provided by external extruder 16. In the disclosed embodiment, the remaining material may be polyethylene terephthalate identical with that provided by central extruder 12, but more preferably would be recycled polyethylene terephthalate (RPET) which is less expensive but not FDA approved for use in contact with a contained food or beverage. External extruder 16 provides material which is not to end up in the inner or central layer. In FIG. 1 the material coming from external extruder 16 passes through a screen filter 18 prior to entering a melt pump to insure that any impurities in the recycled material are screened out. Screen filters may also be employed with other extruders as useful based on the level of impurities in the extruded material.

The products of the three extruders 12, 14 and 16 are passed through melt pumps 22, 24, and 26, respectively prior to being sent through a layer multiplier 30. Although not illustrated in later figures, those embodiments would similarly preferably employ melt pumps between the extruders and the die or layer multiplier. Layer multiplier 30 may constitute an LIM device or more preferably a related modular disk device which results in the extrusion of a multilayer profile with the three materials interspersed into controlled multiple layers.

The multiple layer material is passed from the layer multiplier 30 to die 32 and extruded through die 32 to the calibration system 34. Although not shown in this figure, the calibration system consists of at least one cooling tank for solidifying the molten extrudate and a calibrator for forming and maintaining the composite lamellar stream (the extrudate) into a hollow cylindrical profile (a pipe, tube, or tubular member) with a relatively low degree of eccentricity, preferably less than about 0.2 mm. The material is passed through calibration system 34 where it is calibrated and cooled from a molten state to a fixed state in a carefully controlled process to be discussed in more detail later.

After the material has been extruded and cooled it then moves through a cutter/trimmer system 36 where the material is cut to precise length and preferably trimmed so as to form a flange allowing the use of preferably a standard can closure and base or alternatively of a custom design closure and base. Finally, the cut pieces are passed to handling and packaging system 38, which may very possibly happen at a completely separate location. In handling and packaging system 38; the base is put into place, the container is filled with food or beverage as needed, and then the container is sealed by putting the closure into place. As mentioned, multilayer structures are possible using this process which may enable enhancement of barrier or physical properties. The profile can be extruded in any specific diameter, wall thickness and layer structure depending upon materials and application. Careful control of the cooling and calibration in calibration system 34 provides the possibility of extruding PET or primarily PET polymer successfully in larger diameters and/or with smaller thicknesses than previously accomplished on a commercial basis.

The closures discussed, which may be put in place in the handling and packaging system 38 may provide tamper evident or resealable properties to the resulting container (preferably a PET can). The closures may be fabricated from plastic or metal, preferably being standard metal can closures used in the formation of aluminum cans for similar purposes. Alternatively, special plastic closures may be designed to accomplish any of a number of desirable functions and used in conjunction with this invention. Alternative methods for closure could include the use of sonic welded PET, a heat bond, or a chemical bond to close the end.

Figure 2:
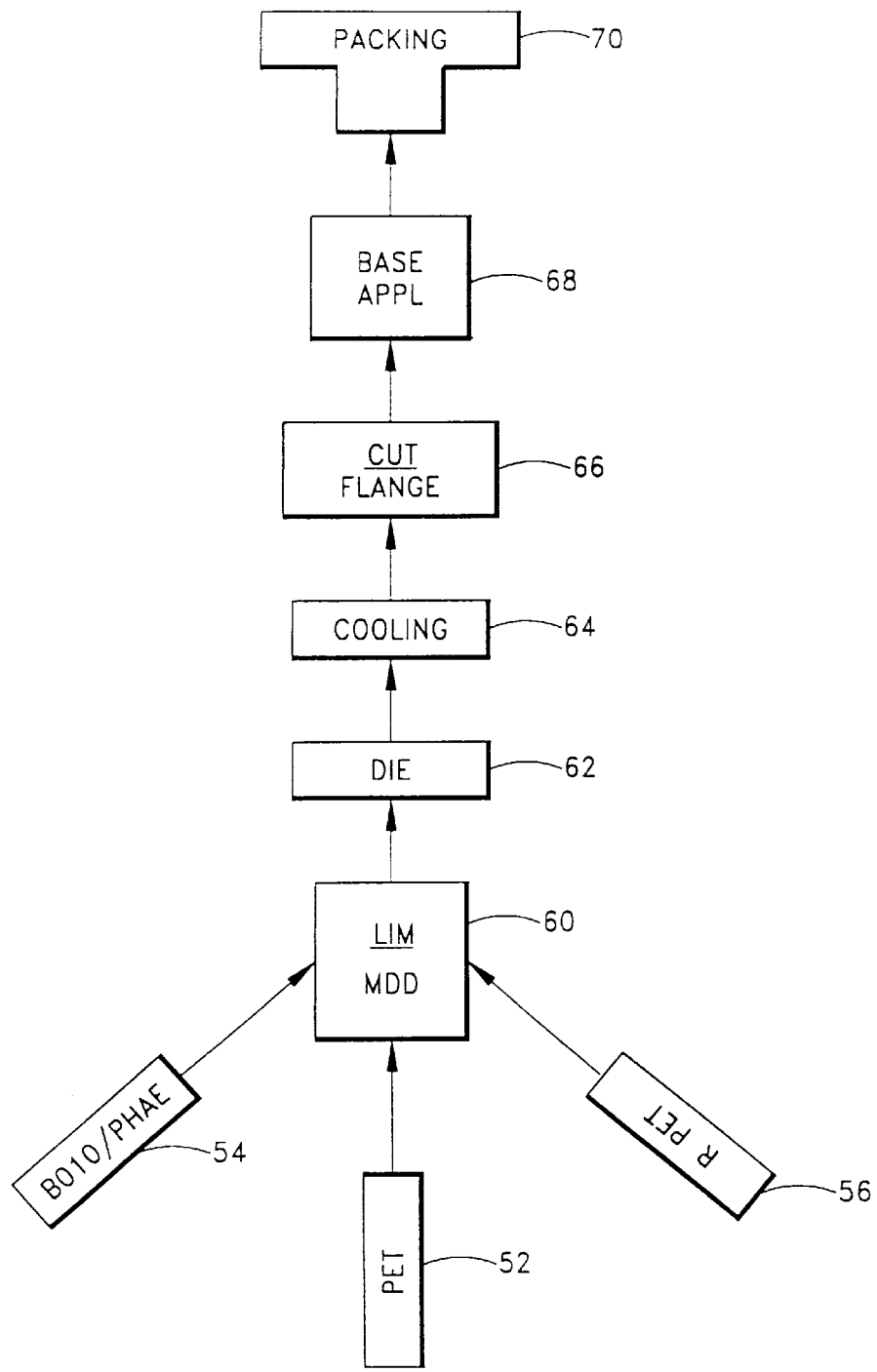
FIG. 2 is a schematic view of an embodiment of the complete process of making the PET-based containers.

FIG. 2 illustrates the preferred embodiment of the present invention in a somewhat more detailed fashion than in FIG. 1. Again three extruders are employed specifically the central extruder 52 extruding PET, a barrier extruder 54 which may be extruding B010 or PHAE, PEN, MXD-6, or EVOH (alternatively a more complex combination barrier could be extruded in this position such as PETG/RHAE, PET/NANO, or PETG/NANO) or other thermoplastic barriers, and external extruder 56 extruding RPET. The products of these extruders are passed through a layer multiplier device 60 which preferably is a modular disk device which takes the materials of the three extruders and places them into multiple specific layers in a controlled order and thickness in order to obtain desired properties. The output of layer multiplier 60 is extruded through die 62, which is a standard, single annular system. From die 62, the extruded material passes into the calibration system 64. The draw down ratio from die 62 to calibration system 64 is of importance. The draw down ratio can change according the to diameter of the profile, as well as the particular materials and thicknesses involved. The draw down ratio preferably ranges from about 1.5 to 1 in some applications up to about 4 to 1 in others.

The melt is extruded through die 62 and enters calibration system 64 where the set up of the calibration system 64 itself determines final diameter and the rate of flow into calibration system 64 determines the wall thickness. A stream of water (preferably in the form of a "water jacket") at the entrance of calibration system 64 forms a cool skin, which prevents the melt from sticking to the wall of the calibration system 64 (specifically the wall of the calibrator itself, also called the calibrator sleeve). Additional details regarding the important aspects of the calibration system are provided later in the specification.

Once the profile passes through the calibration system 64, it is simultaneously cut and flanged to accept a standard can bottom and closure in the cut and flange system 66. Preferably, the can base is applied immediately after the cut/flange system in the base application system 68. The can closure may also be applied at a later date. Packing section 70 preferably occurs in a different location entirely where the can (with bottom or base attached previously) is filled and the closure is applied by means of a typical can seamer known in the art immediately after filling of the can or container with food or beverage.

The final packaging product is a can, which incorporates standard metal or plastic ends, with barrier properties for containing food, containing pharmaceuticals, or containing other products calling for a sealed container with good barrier properties.

Figure 3:
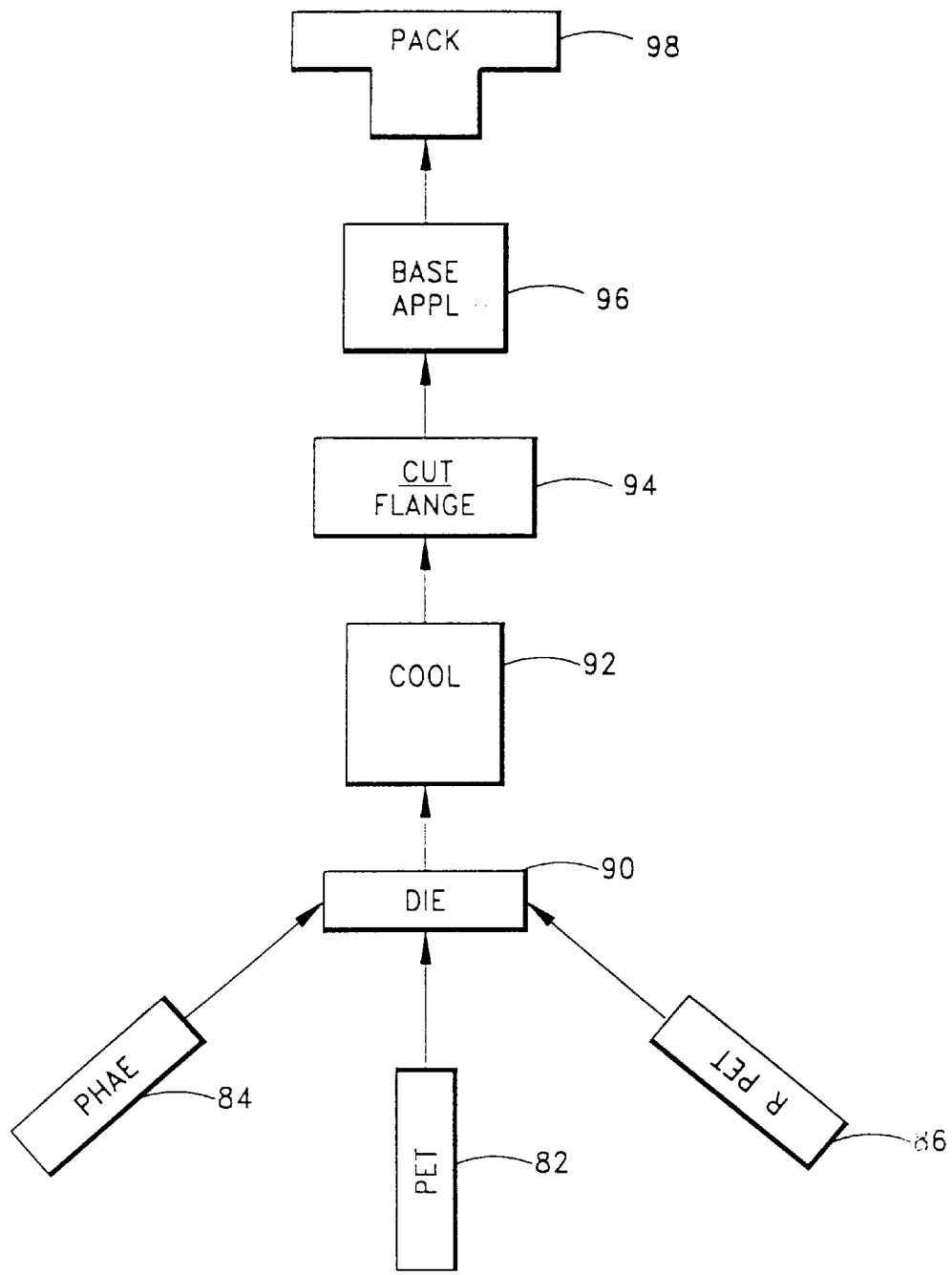
FIG. 3 is a schematic view of an embodiment of the complete process of making the PET-based containers.

FIG. 3 illustrates an alternative embodiment of the process. Virgin PET material is extruded from central extruder 82, a barrier material (PHAE in this embodiment) is extruded from barrier extruder 84 and RPET is extruded from external extruder 86. The three streams are coextruded through die 90, again with the stream of central extruder 82 forming the innermost layer, the PHAE stream from barrier extruder 84 forming an intermediate barrier layer, and the RPET stream from external extruder 86 forming the outer layer. Preferably, the RPET would provide the thickest layer, while it is critical that the PET or virgin PET be the innermost layer. The extruded profile is similarly passed through calibration system 92, cut and flange system 94, the base application system 96, and finally packing and closure system 98.

Figure 4:
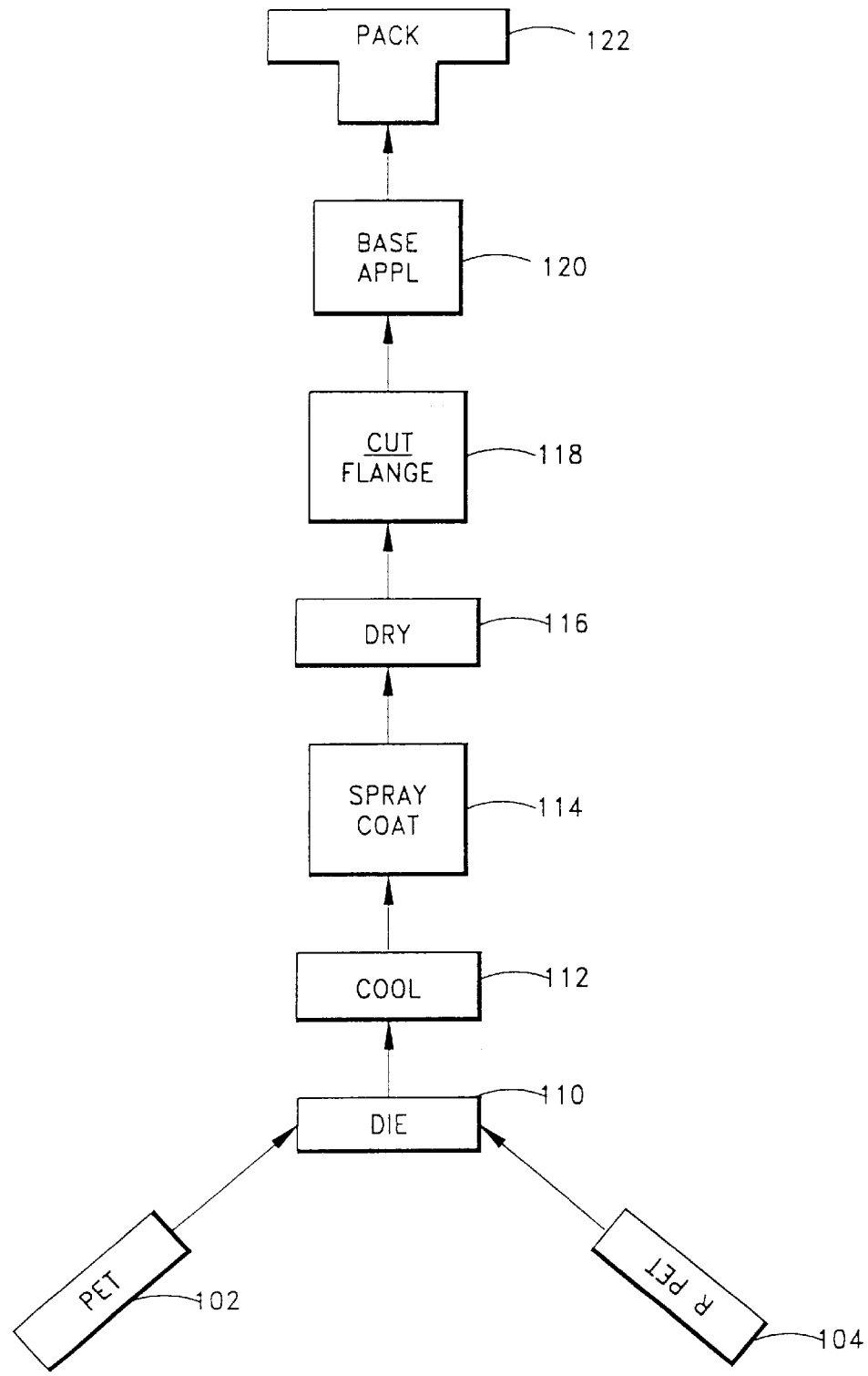
FIG. 4 is a schematic view of an embodiment of the complete process of making the PET-based containers.

FIG. 4 illustrates a simpler system with only two extruders, a virgin PET extruder 102 and an RPET extruder 104 extruding their materials through die 110 and calibration system 112 as with the previous embodiments. After calibration system 112, the profile is then sprayed or submersed in a liquid barrier coating of PHAE (poly(hydroxy amino ethers)) in the coating system 114. This coating acts as a barrier layer, again to improve freshness and storage time of the packaged product. Alternatively, other materials could be used in the coating process or other methods of coating could be used, for example extrusion coating, to provide either enhanced barrier properties or other enhanced properties to the final product. The coated profile then goes to a drying system 116 to remove solvents or residuals from the liquid coating. The dry coated profile is then passed through cut and flange system 118, then base application system 120, and finally packaging and closure system 122, as discussed previously.

Figure 5:
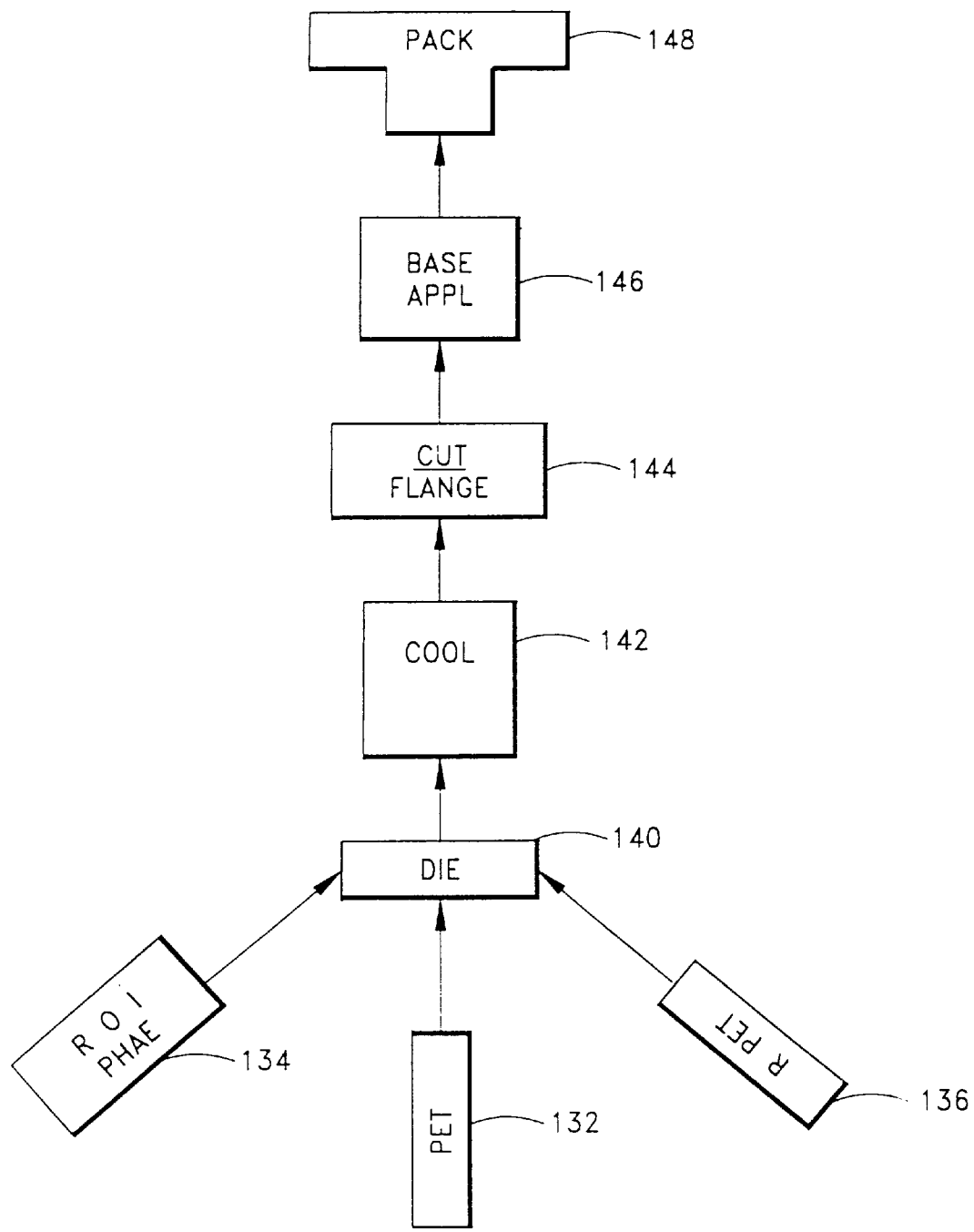
FIG. 5 is a schematic view of an embodiment of the complete process of making the PET-based containers.

FIG. 5 illustrates a final embodiment, which is very similar to the embodiment of FIG. 3, with the exception that in the barrier extruder 134, the extruder 134 acts as a reaction extruder which both produces and processes the barrier material PHAE within the extruder itself. The barrier material produced is combined with the streams from the PET extruder 132 and the RPET extruder 136 to be extruded through die 140, calibration system 142 and then cut and flange system 144, base application system 146, and packing and closure system 148.

One of the most important features of the present invention focuses on the part of the process where the thermoplastic material, which is primarily PET and/or RPET, is extruded and calibrated under conditions which allow the use of PET (with its very low melt strength) in the type of structural configurations necessary to produce the desired containers without need to resort to blow molding, or larger scale injection molding techniques.

Figure 6:
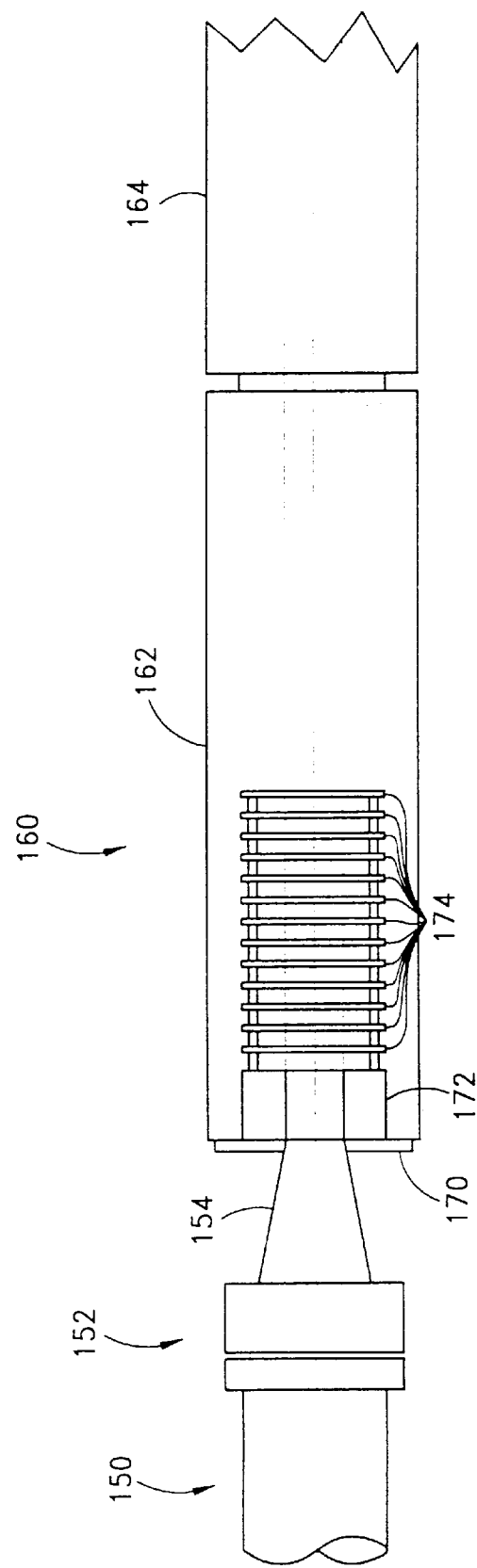
FIG. 6 is a cut-away illustration of the die and the calibration system.

FIG. 6 shows the die and calibration system of one embodiment of the process in more detail. Material from the extruders, collectively 150, is passed through extruder die 152 and emerges as melt 154. In the present example, this melt is preferably at about 540° F. This melt will tend to range from 510° F. to 575° F. The melt 154 is drawn down from die 152 to calibrator 160. The draw down ratio will typically be related to the diameter and wall thickness of the desired profile as discussed previously. The drawn down melt is passed through the calibrator entrance 170 which includes a "water jacket" (a spray of water against the melt profile) impacting the outer surface of the melt with water at temperatures ranging from 35°–100° F., and preferably in within the range of 45°–70° F., although the water jacket temperature may be used within the range of 38°–50° F. if the melt is not very viscous or is composed of a low intrinsic viscosity material. From there, the profile passes through the main body 172 of the calibrator proper and then through a series of calibrator rings 174. Having passed through calibrator entrance 170, the remaining portions of the calibrator proper occur within a first vacuum tank 162 which is water cooled to temperatures ranging from 45°–100° F., more preferably 60°–90° F., and most preferably 60°–80° F. The tank also provides a vacuum which pulls the melt or profile firmly onto the surface of the internal sleeve through which it is passing. This vacuum, ranging in pressure from 1.2 inches of mercury to 4 inches of mercury depending on the thickness of the profile being produced, helps reduce eccentricities in the shape of the profile which may be introduced due to gravity or melt characteristics, or similar effects. The profile then passes into and through a second vacuum tank 164 at approximately atmospheric pressure but at a cooler temperatures, preferably within the range of 35°–60° F., and most preferably within the range of 40°–60° F.

Figure 7:
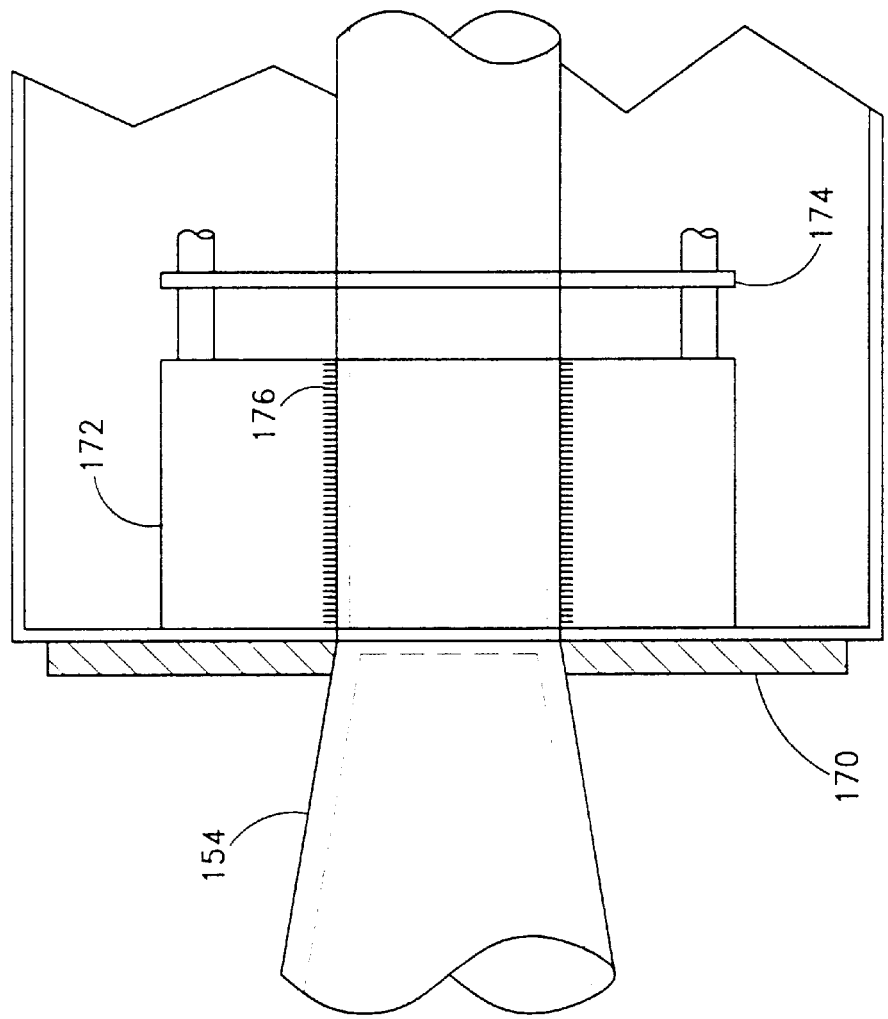
FIG. 7 is a more detailed cut-away illustration of the calibrator within the calibration system.

FIG. 7 shows a detailed view of the entrance to calibration system 160. Again the calibrator entrance 170 with water jacket is shown followed by main body 172 of the calibrator which is preferably brass and possesses rifles 176. In addition, calibrator rings 174 are preferably made of stainless steel with a vapor honed and highly chromed contact surface. Both the main body 172 and the rings 174 could be made of other materials with similar strength, surface, and thermal properties. The surface quality of the extruded and calibrated profile is directly influenced by the rifling and the brass calibrator. The combination of the materials, design and process temperatures relate to the dimensional and surface quality of the extruded pipe.

The stream of water at the calibrator entrance 170 (the water jacket) forms the cool skin preventing the melt from sticking to calibrator wall through the main body 172 of the calibrator. The rifles 176 help reduce friction and sticking while the melt is flowing and solidifying. The hard vacuum within both cooling tanks helps maintain the diameter and low eccentricity for the extruded pipe or tube. The two separate chambers of the cooling tank section of the calibrator system provide the different water temperatures discussed in order to control the rate of cool throughout the calibration. Selection of temperatures for the water used at the calibrator entrance, the temperature at the first cooling tank, and the temperature in the second cooling tank provide the critical ingredients to successfully extruding the primarily PET profile in the diameters and thicknesses desirable for the formation of food or beverage containers without the need for blow molding. While the disclosed embodiments employ two separate cooling tanks, the desired results could be achieved by using other methods to gradate the temperatures similarly along the cooling path of the profile, for example, additional cool down tanks could be used allowing more flexibility in the rate/decrement of cool down temperature.

Figure 8:
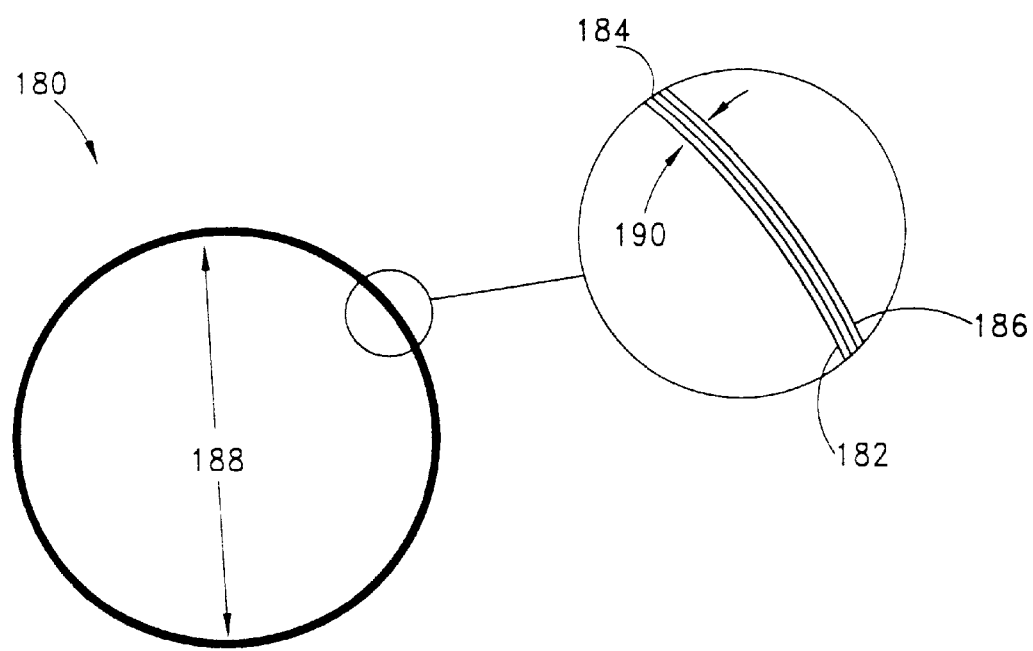
FIG. 8 is a cut-away illustration of the PET based profile.

FIG. 8 shows the configuration of a simple final extruded profile 180 using the present process. In the illustrated example the inner layer 182 is made up of PET, the middle layer 184 is a barrier layer, and the outer layer 186 comprises recycled PET. As previously discussed, use of the inventive process provides the possibility of extruding PET or primarily PET polymer successfully in larger diameters and/or with smaller thicknesses than previously accomplished on a commercial basis while maintaining acceptable quality control including minimizing the eccentricity of the products. Profiles 180 may be successfully extruded with an inner diameter 188 of greater than about 30 mm, preferably between 30 mm and 150 mm, and most preferably between 80 mm and 100 mm. The improved fine control provided by this invention provides profiles 180 which may be extruded with total thicknesses 190 (thickness of all of the combined layers) of less than or equal to (i.e., no more than) about 0.08 inch, preferably less than or equal to about 0.06 inch, more preferably within the range of 0.01 inch to 0.05 inch, and most preferably within the range of 0.02 inch to 0.04 inch.

Figure 9:
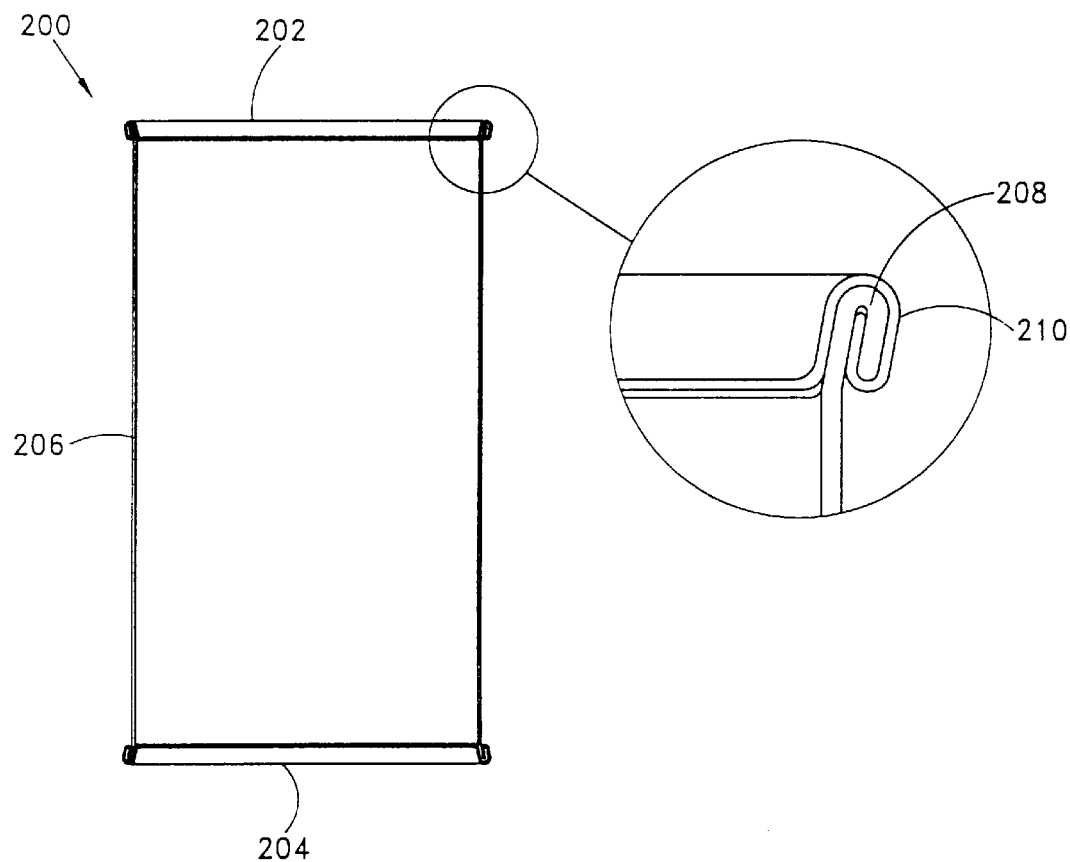
FIG. 9 is a cut-away illustration of an embodiment of the final container.

FIG. 9 illustrates a preferred embodiment of a completed container 200 where profile 206 is sealed by a metal lid 202 and base 204. Flanged end 208 of the profile has been seamed with the edge 210 of lid 202 in a standard can seamer. This seam covers the complete circumference of lid 202. Base 204 is similarly seamed. Typically, base 204 would be seamed in advance, the material to be stored would be inserted or injected into container 200, and then lid 202 would be applied, sealing in the contained material. Alternative materials could likewise be used for base 204 and lid 202 and similarly seamed by a standard seamer.

Figure 10:
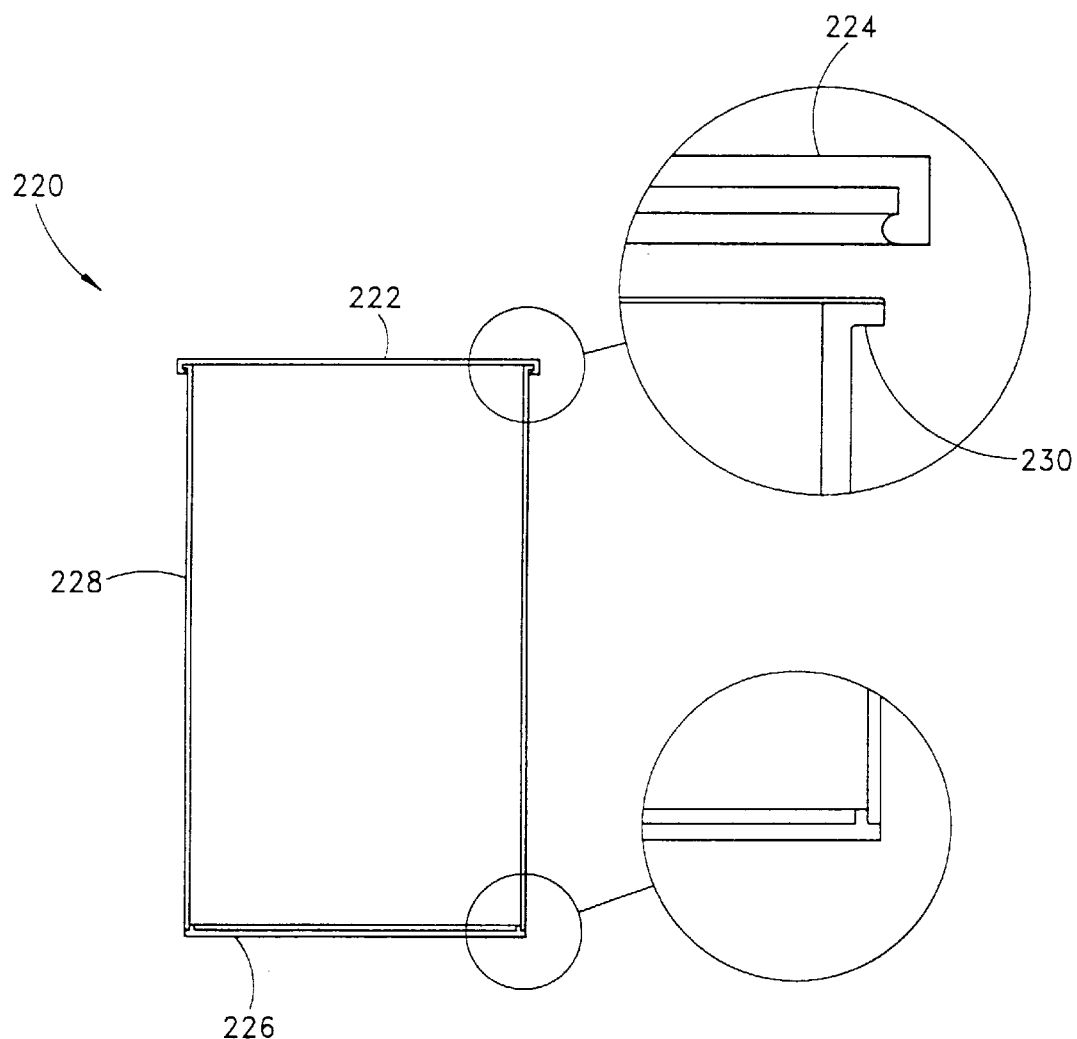
FIG. 10 is a cut-away illustration of an alternative embodiment of the final container.

FIG. 10 illustrates an alternative embodiment of a completed container 220 where extruded profile 228 is sealed by foil seal 222 and by plastic end or base 226. Flange 230 on profile 228 is also provided to assist in holding a plastic lid 224 over sealed container 220 to protect foil seal 222 from accidental puncture or removal. FIG. 10 provides details of an alternative set of junctures and connections between an extruded profile and a lid and base. Numerous other possibilities would also be known and understood by those of skill in the art.

Having described specific embodiments of the present invention, it will be understood that modifications thereof may be suggested to those skilled in the art, and it is intended to cover all such modifications as fall within the scope of the appended claims.

What is claimed is:

1. A container for an ingestible product, said container having a tubular multi-layer wall portion, comprising:

a. an inner multi-component layer of said wall portion formed by extrusion having at least two discrete sublayers and extending longitudinally of said container and terminating in opposing open flanged end portions, one of said sublayers comprising virgin polyethylene terephthalate and another of said sublayers comprising a barrier sublayer of a thermoplastic material having a reduced permeability to oxygen and carbon dioxide relative to the permeability to oxygen and carbon dioxide of said virgin polyethylene terephthalate;

b. said wall portion further comprising an outer layer material formed by extrusion of recycled polyethylene terephthalate, said outer layer material having a thickness greater than the thickness of the barrier sublayer of said interior layer;

c. said multi-layer wall portion extruded and calibrated as an tubular member with a total wall thickness of about 0.01 to 0.08 inches.

2. A process for the production of a multi-layer plastic container, comprising:
  a. providing a first body of a thermoplastic polymer comprising virgin polyethylene terephthalate, a second body of a thermoplastic polymer comprising a barrier material having a reduced permeability to oxygen and carbon dioxide relative to the permeability to oxygen and carbon dioxide of said virgin polyethylene terephthalate, and a third body of a thermoplastic polymer comprising polyethylene terephthalate;
  b. extruding said first, second, and third polymers through a die to provide a tubular profile comprising a composite-multilamellae stream having an inner surface, an outer surface, and at least one discrete lamella of said virgin polyethylene terephthalate and at least another discrete lamella of said barrier material;
  c. spraying the outer surface of said profile with a flow of fluid having a temperature lower than that of said composite stream;
  d. calibrating said profile to an inner diameter of 30 mm to 150 mm;
  e. cooling and solidifying said profile by putting it into thermally conductive contact with a first heat absorbing source;
  f. cooling and solidifying said profile by putting it into thermally conductive contact with a second heat absorbing source after placing it into thermally conductive contact with said first heat absorbing source, wherein said second heat absorbing source is cooler than said first heat absorbing source;
  g. cutting said cooled and solidified profile into sections having first and second open ends.

3. The process of claim 2, further comprising after said cutting:
  h. forming flanges on the first and second ends of at least one of said profile sections;
  i. sealing said first end of said profile section by attaching a standard can base to said first end.

4. The process of claim 3, herein said third body of a thermoplastic polymer comprises recycled polyethylene terephthalate.

5. The process of claim 3, further comprising:
  j. filling said profile section sealed at said first end with ingestible material;
  k. sealing said profile section by attaching a standard can closure to said second end of said profile section.

6. The process of claim 3, wherein said thermally conductive contact with said first heat absorbing source and said thermally conductive contact with said second heat absorbing source is direct contact.

7. The process of claim 3, wherein said thermally conductive contact with said first heat absorbing source and said thermally conductive contact with said second heat absorbing source is indirect thermally conductive contact.

8. The process of claim 3, wherein said first heat absorbing source comprises a body of fluid having a temperature within the range of 60° F. to 100° F.; and wherein said second heat absorbing source comprises a body of fluid having a temperature within the range of 35° F. to 60° F.

9. The process of claim 8, wherein during said spraying said flow of fluid has a temperature within the range of 50° F. to 100° F.

10. A process for the production of a multi-layer plastic container, comprising:
  a. providing a first body of a thermoplastic polymer comprising virgin polyethylene terephthalate, a second body of a thermoplastic polymer comprising a barrier material having a reduced permeability to oxygen and carbon dioxide relative to the permeability to oxygen and carbon dioxide of said virgin polyethylene terephthalate, and a third body of a thermoplastic polymer comprising polyethylene terephthalate;
  b. extruding said first, second, and third polymers through a die to provide a tubular profile including a composite-multilarnellae stream comprising a wall having at least one discrete lamella of said virgin polyethylene terephthalate and at least another discrete lamella of said barrier material, wherein said stream has an inner surface and an outer surface;
  c. spraying the outer surface of said profile with a flow of fluid having a temperature lower than that of said composite stream;
  d. calibrating said profile to a total wall thickness of about 0.01 to 0.08 inches;
  e. further cooling and solidifying said profile by putting it into thermally conductive contact with a first heat absorbing source;
  f. further cooling and solidifying said profile by putting it into thermally conductive contact with a second heat absorbing source after placing it into thermally conductive contact with said first heat absorbing source, wherein said second heat absorbing source is cooler than said first heat absorbing source;
  g. cutting said cooled and solidified profile into sections, wherein each section has first and second open ends.

11. The process of claim 10, further comprising after said cutting:
  h. forming flanges on the first and second ends of at least one of said profile sections;
  i. sealing said first end of said profile section by attaching a standard can base to said first end.

12. The process of claim 11, wherein said third body of a thermoplastic polymer comprises recycled polyethylene terephthalate.

13. The process of claim 11, further comprising:
  j. filling said profile section sealed at said first end with ingestible material;
  k. sealing said profile section by attaching a standard can closure to said second end of said profile section.

14. The process of claim 11, wherein said thermally conductive contact with said first heat absorbing source and said thermally conductive contact with said second heat absorbing source is direct contact.

15. The process of claim 11, wherein said thermally conductive contact with said first heat absorbing source and said thermally conductive contact with said second heat absorbing source is indirect thermally conductive contact.

16. A multilayer tube adapted to be formed into a container, comprising:
  an inner multi-component layer formed by extrusion having at least two discrete sublayers wherein at least a first sublayer comprises virgin polyethylene terephthalate and at least a second sublayer comprises a thermoplastic barrier material having a reduced permeability to oxygen and carbon dioxide relative to that of the virgin polyethylene terephthalate; and
  an outer layer formed by extrusion comprising recycled polyethylene terephthalate wherein the outer layer is thicker than the second sublayer;
  wherein the tube has an inner diameter of about 30 mm to about 150 mm.

17. A multilayer tube as in claim 16, wherein the first and second open ends of the tubular multi-layer wall portion terminate in a flange.

18. A multilayer tube adapted to be formed into a container, comprising:
- an inner multi-component layer formed by extrusion having at least two discrete sublayers wherein at least a first sublayer comprises virgin polyethylene terephthalate and at least a second sublayer comprises a thermoplastic barrier material having a reduced permeability to oxygen and carbon dioxide relative to that of the virgin polyethylene terephthalate; and
- an outer layer formed by extrusion comprising recycled polyethylene terephthalate wherein the outer layer is thicker than the second sublayer;

wherein the tube has an overall thickness of from about 0.01 inches to about 0.08 inches.

19. A multilayer tube as in claim 18, wherein the first and second open ends of the tubular multi-layer wall portion terminate in a flange.

* * * * *

UNITED STATES PATENT AND TRADEMARK OFFICE
CERTIFICATE OF CORRECTION

PATENT NO.   : 6,109,006
DATED        : July 14, 1998
INVENTOR(S)  : Gerald A. Hutchison et al.

It is certified that error appears in the above-identified patent and that said Letters Patent is hereby corrected as shown below:

Title page,
Item [75], Inventors, add the name -- Robert A. Lee -- as a joint inventor.

Signed and Sealed this

Twenty-eighth Day of December, 2004

JON W. DUDAS
*Director of the United States Patent and Trademark Office*